United States Patent [19]

Nakamura

[11] Patent Number: 4,760,466
[45] Date of Patent: Jul. 26, 1988

[54] IMAGE SCANNER CONTROLLER
[75] Inventor: Kimikazu Nakamura, Saitama, Japan
[73] Assignee: Fuji Xerox Co., Ltd., Tokyo, Japan
[21] Appl. No.: 48,938
[22] Filed: May 12, 1987
[30] Foreign Application Priority Data May 13, 1986 [JP]  Japan ................................. 61-109194

[51] Int. Cl.⁴ .............................................. H04N 1/40
[52] U.S. Cl. .................................... 358/294; 358/280; 358/293
[58] Field of Search ............... 358/293, 294, 280, 285, 358/213.31

[56] References Cited
U.S. PATENT DOCUMENTS 4,465,939 8/1984 Tamura ................................. 358/294
4,688,098 8/1987 Kon .................................. 358/213.31
4,692,812 9/1987 Hirahara ............................. 358/294

Primary Examiner—Howard W. Britton
Attorney, Agent, or Firm—Finnegan, Henderson, Farabow, Garrett & Dunner

[57] ABSTRACT

A controller for controlling an image scanner which is used for reading an original document to generate video signals according to the content of the document. The image scanner controller comprises a plurality of image sensors for segmenting and reading lines on the document in a main scanning direction, at least two groups of line buffer memories for storing and subsequently reading the signals read by the image sensors, and a control circuit for writing segment data for one line into one line buffer memory while segment data of a previously read line is read out of another of the line buffer memories at a rate higher than the reading rate of the image sensors.

7 Claims, 2 Drawing Sheets

IMAGE SCANNER CONTROLLER

FIELD OF THE INVENTION

The present invention relates to an image scanner and, more particularly, to an image scanner controller for preventing the scanning rate of an image scanner from having to be reduced, even if the image sensor used is not highly sensitive.

BACKGROUND OF THE INVENTION

Known image scanners may be equipped with a plurality of one-dimensional contact type image sensors such as CCDs. FIG. 5 shows a case in which the reading is executed by an image scanner equipped with two image sensors A and B. In the main scanning direction of line 1, the sensor A reads 0, 1, 2 . . . , and (N−1) sequentially, and the sensor B reads N, N+1, N+2, . . . , and M−1 sequentially. When the reading of the line 1 is completed, the two sensors A and B together read lines 2, 3, 4, . . . and so on in the auxiliary scanning direction while sharing their functions as in line 1. The video signals thus read out are converted into binary signals, for example, and are stored in a buffer memory (not shown) until they are outputted to a signal processor (not shown) where they are subjected to predetermined signal processing.

Image scanner of the prior art, however, can read the lines with a clock frequency as high as 100 nsec if they use a read element having a high sensitivity such as a CCD as its image sensor, but must read with a clock frequency as low as 250 nsec when using a read element having a lower sensitivity such as an amorphous silicon element. Such a relatively low scanning rate in the case of a low sensitivity read element is, of course, undesirable.

OBJECTS AND SUMMARY OF THE INVENTION

An object of the present invention is to provide an image scanner controller capable of high scan rate when a low sensitivity sensor is used as an image sensor.

Another object of the present invention is to provide an image scanner controller that is simple in design and operation.

A further object of the present invention is to provide an image scanner controller that is reliable and relatively inexpensive.

These and other objects are attained by a controller comprising a plurality of image sensors for reading a line on a document in a main scanning direction, each of the image sensors reading a different segment of the line, at least two groups of line buffer memories for selectively storing the segments, buffer memories for selectively outputting the segments stored therein, and control means for controlling the buffer memories such that at least one of the memories is storing the segments of one line of a first rate when another of the buffer memories is outputting the segments comprising a preceding line at a second rate higher than the first rate.

BRIEF DESCRIPTION OF THE DRAWINGS

The manner by which the above and other objects, features and advantages of the present invention are attained will become fully apparent from the following description to be made with reference to the accompanying drawings, in which.

DETAILED DESCRIPTION OF THE INVENTION

Figure 1:
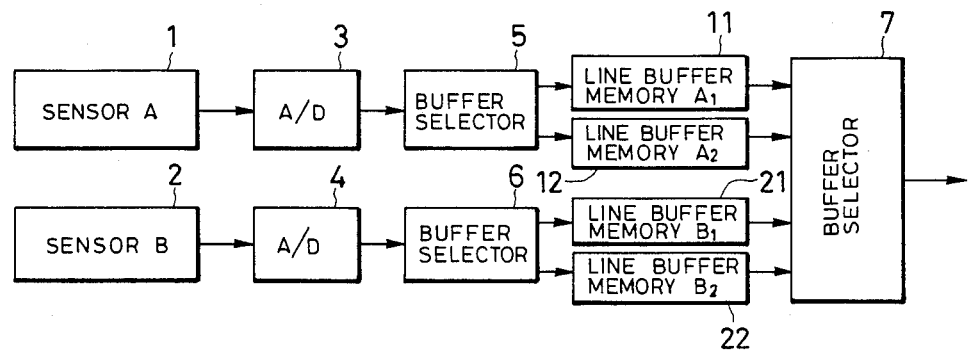
FIG. 1 is a block diagram showing an image scanner controller according to one embodiment of the present invention.

FIG. 1 shows an image scanner controller according to one embodiment of the present invention. This image scanner controller includes first and second image sensors 1 and 2 made of amorphous silicon, for example, for segmenting and reading individual scan lines. A pair of A/D converters 3 and 4 convert the video signals read out by the image sensors 1 and 2, respectively, into digital signals. The outputs of the A/D converters 3 and 4 are provided as digital values to buffer selectors 5 and 6, respectively. The buffer selector 5 selectivly outputs digital scan data to line buffer memories 11 or 12 and the buffer selector 6 selectively outputs digital scan data to buffer memories 21 or 22. The line buffer memories 11 and 21, and 12 and 22 are segmented into two groups such that while data is being written into the line buffer memories of one group, the buffer memories of the other group are being read in accordance with a predetermined timing and in a manner that the writing and reading operations are executed alternately. A buffer selector 7 selects a predetermined one of the line buffer memories 11, 12, 21, and 22 in accordance with a predetermined timing to cause it to read, i.e., output, the digital video signals stored therein.

Figure 2:
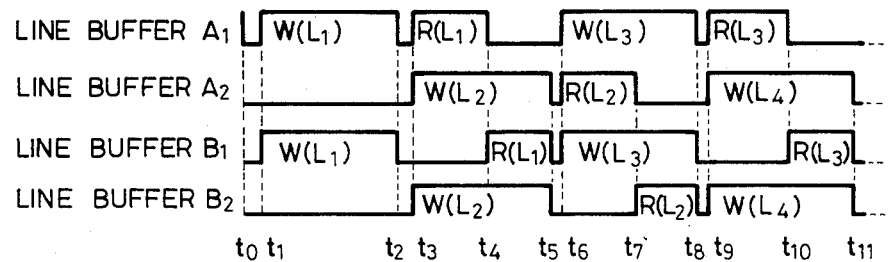
FIG. 2 is a time chart showing the operations of the image scanner controller of FIG. 1.
Figure 5:
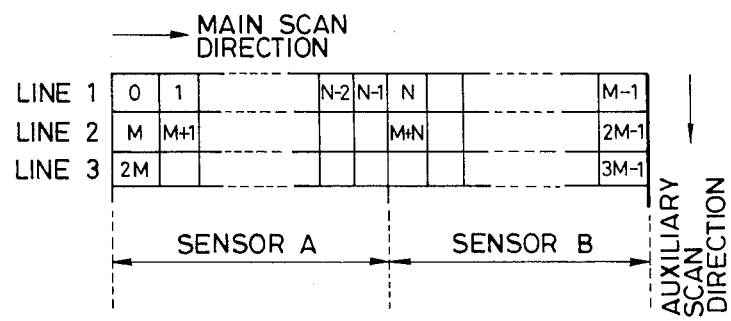
FIG. 5 is an explanatory view showing the scanning operation of an image scanner of the prior art.

The operations of the image scanner controller thus constructed will be described with reference to the time chart of FIG. 2.

When a scanning operation is commanded (at $t_0$), the first and second image sensors 1 and 2 begin to read the line 1 in the above-described manner. The reading rate is based on a clock frequency as low as 250 nsec, for example, and the video signals read out are converted into digital values by the A/D converters 3 and 4. These video signals thus digitized are written during the interval $t_1$ to $t_2$ in the line buffer memories 11 and 21 which are selected by the buffer selectors 5 and 6, respectively. W designates the writing operation, and letter $L_1$ designates line 1.

When the reading and writing operations of line 1 are completed, the reading operation of line 2 is started so that the video signals are written during the interval $t_3$ to $t_5$ into the line buffer memories 12 and 22 through the aforementioned A/D converters 3 and 4 and buffer selectors 5 and 6. Simultaneously, with this writing operation and at time $t_3$, the buffer selector 7 selects the line buffer memory 11 and reads the previously written video signals from the line 1 and outputs them to a signal processor (not shown) at a later stage (for example during the interval $t_3$ to $t_4$). This output is issued at a rate twice as high as the aforementioned clock frequency, e.g., a clock frequency of 125 nsec. Next, the line buffer memory 21 is selected so that the remaining video signals for line 1 are read during the interval $t_4$ to $t_5$. Here, letter R designates the reading operation, and letter $L_2$ designates the line 2. Then, as indicated during the interval $t_6$ to $t_{11}$, the writing operations for lines 3 and 4 and the reading operations for lines 2 and 3 are conducted alternately. Here, letters $L_3$ and $L_4$ designate lines 3 and 4, respectively.

In the above-described manner, the reading and writing operations of the image sensors 1 and 2 are conducted at lower clock frequencies. However, the writing and reading operations are separated so that the reading operation is conducted at a higher clock frequency than the writing operation to prevent the scanning rate from being reduced.

Figure 3:
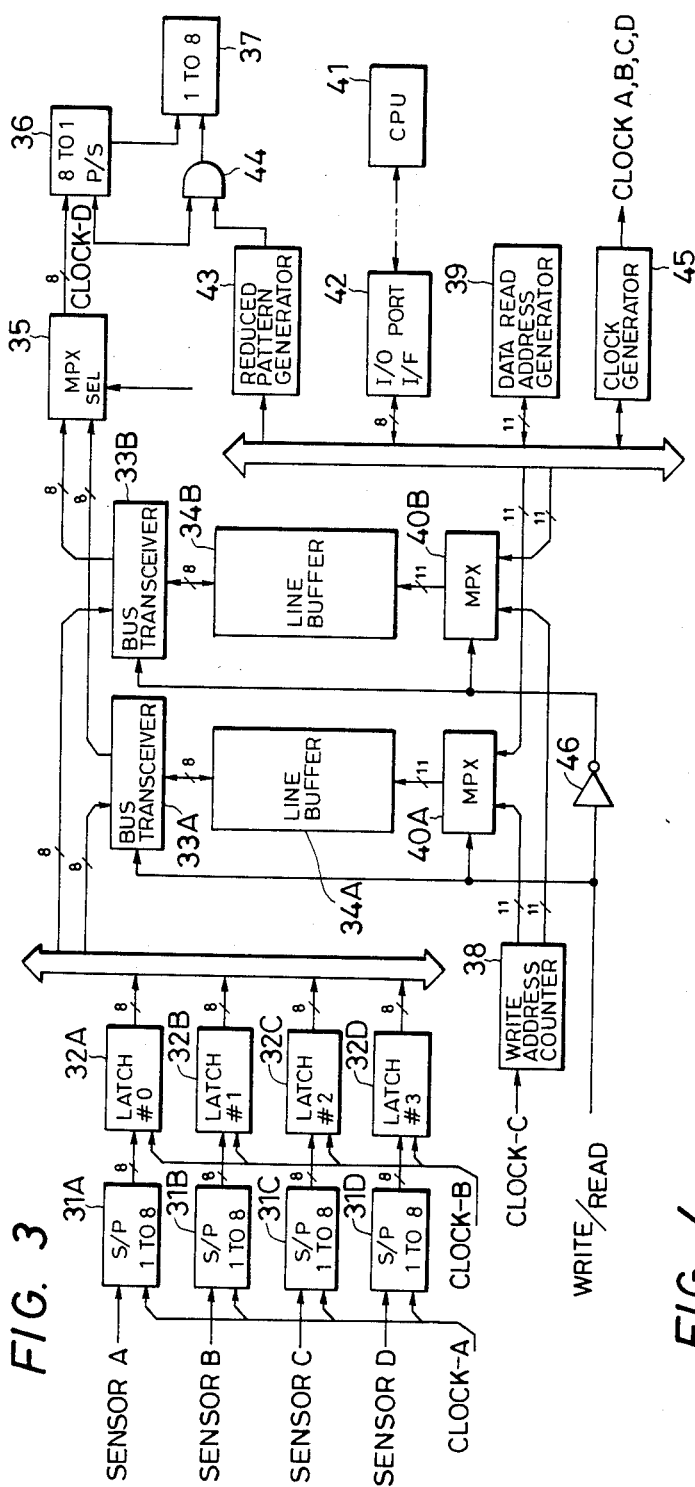
FIG. 3 is a block diagram showing an image scanner controller according to another embodiment of the present invention.

FIG. 3 shows another embodiment of the present invention. The image scanner controller according to this embodiment is constructed of shift registers 31A, 31B, 31C, and 31D for receiving the video signals (which have been subjected to A/D conversion) of four images sensors A, B, C, and D in series and issuing the same in parallel. Latches 32A, 32B, 32C, and 32D latch the parallel output signals of the shift registers 31A, 31B, 31C, and 31D, respectively. Line buffer memories 34A and 34B are provided for writing and reading the video signals through bus transceivers 33A and 33B, respectively. A parallel-to-serial (P/S) converter 36 receives in parallel the bus signals selected by a multiplexer 35 in response to a select signal and issues them in series to an output circuit 37.

The image scanner controller further includes a write address counter 38 for issuing a write address signal, a data read address generator 39 for issuing a read address signal, multiplexers 40A and 40B for selecting the write and read address signals and providing the selected signals to the line buffer memories 34A and 34B. A CPU (i.e., Central Processing Unit) 41 controls the operations of individual circuits in addition to controlling the later-described writing and reading operations on the basis of predetermined arithmetic operations. An input/output interface 42 inputs and outputs data and commands from and to the CPU 41. A reduced pattern generator 43 issues a reduction signal in response to a reduction command from the CPU 41 and an AND gate 44 controls data input to the output circuit 37 on the basis of the reduction signal. A clock generator 45 generates clock signals A, B, C and D and an inverter 46 is provided to invert the write and read signals.

Figure 4:
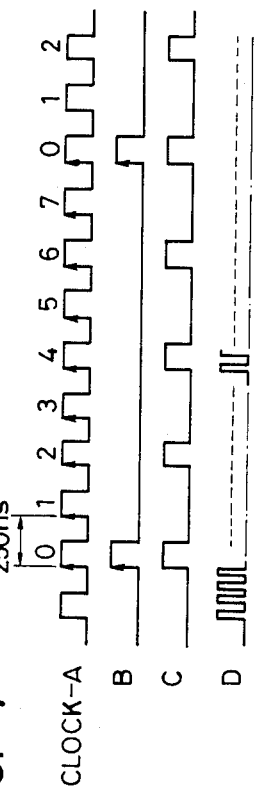
FIG. 4 is a waveform chart showing clock frequencies of the image scanner controller of FIG. 3.

The operations of the image scanner controller of FIG. 3 will be described in connection with the clock signals A, B, C and D of FIG. 4.

When the image sensors A, B, C and D read a predetermined line on the basis of the clock A having a frequency of 250 nsec, the signals thus read out are inputted in series to the corresponding shift registers 31A to 31D on the basis of the clock A. After a serial signal of 8 bits is inputted to the shift registers 31A to 31D, it is latched as a parallel signal by the latches 32A to 32D on the basis of the clock B having a frequency of one-eighth the frequency of the clock A. The latched signals of the latches 32A to 32D supplied to the line buffer memory 34A which addressed (through the multiplexer 40A) in accordance with the write address signal that is generated by the write address counter 38 on the basis of the clock C having a frequency that is one-half the frequency of the clock A. The transferred signals are sequentially stored (through the bus transceiver 33A) in a time sharing manner. At this time, the bus transceiver 33A and the multiplexer 40A are each receiving the write signal.

When the next line is read by the image sensors A to D, the signals are inputted to the shift registers 31A to 31D on the basis of the clock A and are latched by the latches 32A to 32D on the basis of the clock B. The parallel signals thus latched are stored in the line buffer memory 34B on the basis of the inversion of the read signal by the inverter 46. The storing operations are similar to those of the line buffer memory 34A, and the addresses are designated in accordance with the address signal of the write address counter 38 based on the clock C. This addressing operation is conducted through the multiplexer 40B, and the latched signals are sequentially transferred in a time sharing manner from the latches 32A to 32D through the bus transceiver 33B.

At the same time, the read signal is supplied to the bus transceiver 33A and the multiplexer 40A, and the read address is given from the data read address generator 39 to the multiplexer 40A. The multiplexer 35 selects the data bus connected with the bus transceiver 33A in response to the select signal and transmits the previously stored parallel signal to the P/S converter 36 on the basis of the clock D. The P/S converter 36 is given the clock D having a frequency four times as high as that of the clock A to output its serial signal to the output circuit 37 on the basis of the clock D. The inputting, reading, and writing operations described above are repeatedly conducted for each line.

The following description is directed to the case in which the reduction command is outputted from the CPU 41. If a reduction signal for a data reduction of 25%, for example, is outputted from the CPU 41, it is given through the input/output interface 42 to the reduction pattern generator 43. This reduction pattern generator 43 gives the AND circuit 44 the reduction signal identical to the signal from which the $(4n-1)$th ($n=1, 2, 3, \ldots$) clock (e.g., 3, 7, 11, $\ldots$) of the clocks 0, 1, 2, 3, $\ldots$ of the clock D is removed. As a result, the AND circuit 44 gives the output circuit 37 the aforementioned reduction signal in accordance with the AND condition with the clock D so that the individual $(4n-1)$th bits are removed from the serial video signals inputted from the P/S converter 36 to the output circuit 37 on the basis of the elimination of every $(4n-1)$th clock pulse. This removal reduces the number of bits of the serial video signal to ¾ so that the image obtained is reduced to ¾ (i.e., by 25%). Although the reduction operations described above are directed to those in the main scanning direction, the reduction in the auxiliary scanning direction can be conducted by removing all the serial video signals of the $(4n-1)$th line.

In the respective operations thus far described, the clocks A, B, C and D are naturally generated by the clock generator 45.

As has been described hereinbefore, the image scanner controller according to the present invention is enabled to have a reading rate higher than that of the image sensor of the prior art having a read element of lower sensitivity, by providing at least two groups of line buffer memories in a manner to correspond to a plurality of image sensors and by reading, while the line buffer memories of one group are being written, the similar buffer memories of the other group such that the writing and reading operations are executed alternately or sequentially (in the case of three or more groups). This makes it possible to prevent the scanning rate from dropping even if the image sensor used as the image sensor is not highly sensitive.

What is claimed is:

1. A controller for controlling an image scanner to read successive lines on an original document along a main scanning direction and generating video signals representing the content of the document, the controller comprising:
   a plurality of image sensors for reading a line on the document in the main scanning direction, each of said image sensors reading a different segment of the line;
   at least two groups of line buffer memories for selectively storing said segments, said buffer memories selectively outputting said segments stored therein; and
   control means for controlling said line buffer memories such that at least one of said memories is storing said segments of one line at a first rate when another of said buffer memories is outputting said segments comprising a preceding line at a second rate higher than said first rate;
   said control means comprising an output buffer selector coupled to said at least two groups of line buffer memories for alternately selecting outputs from said at least two groups of line buffer memories.

2. A controller according to claim 1, wherein said image sensors include a first image sensor for producing a first series of video signals representing a first segment of a line and a second image sensor for producing a second series of video signals representing a second segment of that line, and wherein the controller further includes a first A/D converter for converting said first series of video signals into a first series of digital video signals and a second A/D converter for converting said second series of video signals into a second series of digital video signals.

3. A controller according to claim 1, wherein said image sensors include a first image sensor for producing a first series of video signals representing a first segment of a line and a second image sensor for producing a second series of video signals representing a second segment of a line, and wherein said controller further comprises:
   a first A/D converter for converting said first series of video signals into first digital video signals and a second A/D converter for converting said second series of video signals into second digital video signals;
   first, second, third, and fourth line buffer memories;
   a first buffer selector for selectively transferring said first digital video signals to said first and second line buffer memories;
   a second buffer selector for selectively transferring said second digital video signals to said third and fourth line buffer memories; and
   wherein said output buffer selector alternately selects said first digital video signals from said first and second buffer memories and said second digital video signals from said third and fourth buffer memories.

4. A controller according to claim 3, wherein said first, second, third, and fourth buffer memories have a data storing rate and a data output rate that is higher than said data storing rate.

5. A controller according to claim 4, wherein said image sensors are formed from amorphous silicon.

6. A controller for controlling an image scanner to read successive lines on an original document along a main scanning direction and generating video signals representing the content of the document, said controller comprising:
   a first image sensor for producing a first series of video signals representing a first segment of a line;
   a second image sensor for producing a second series of video signals representing a second segment of the line;
   a first A/D converter for converting said first series of video signals into a first series of digital video signals;
   a second A/D converter for converting said second series of video signals into a second series of digital video signals;
   a first shift register for receiving said first series of digital video signals and for outputting a first parallel video signal;
   a second shift register for receiving said second series of digital video signals and for outputting a second parallel video signal;
   a first latch for latching said first parallel video signal;
   a second latch for latching said second parallel video signal;
   at least two groups of line buffer memories for selectively storing said first and second parallel video signals;
   control means for controlling said line buffer memories such that at least one of said memories is storing said segments of one line at a first rate when another of said buffer memories is outputting said segments comprising a preceding line at a second rate higher than said first rate;
   a first multiplexer for selecting a select signal comprising either said first parallel video signal or said second parallel video signal;
   a parallel-to-serial converter for converting said select signal into a serial signal; and
   an output circuit for outputting said serial signal.

7. A controller according to claim 6, further comprising:
   a write address counter for outputting a write address signal;
   a data read generator for outputting a read address signal;
   a second multiplexer for selecting the write and read address signals and supplying said selected address signals to said line buffer memories;
   a central processing unit for controlling the operations of said components of the controller on the basis of predetermined arithmetic operations, said central processing unit supplying write and read signals to control the storing of data in said line buffer memories and the outputting of stored data from said line buffer memories;
   an input/output interface for inputting and outputting data and commands to and from said central processing unit;
   a reduced pattern generator for outputting a reduction signal in response to a reduction command from said central processing unit;
   an AND gate for selectively inhibiting the transfer of said serial signal to said output circuit on the basis of said reduction signal;
   a clock generator for generating clock signals; and
   an inverter for inverting said write and read signals.

* * * * *